United States Patent
Kuo et al.

(10) Patent No.: US 12,474,405 B2
(45) Date of Patent: Nov. 18, 2025

(54) TEST DEVICE AND TESTING METHOD FOR MEMORY DEVICE

(71) Applicant: Winbond Electronics Corp., Taichung (TW)

(72) Inventors: Ying-Shan Kuo, Hsin Chu County (TW); Lih-Wei Lin, Hsinchu (TW); You Cyun Su, Hsin Chu County (TW)

(73) Assignee: Winbond Electronics Corp., Taichung (TW)

( * ) Notice: Subject to any disclaimer, the term of this patent is extended or adjusted under 35 U.S.C. 154(b) by 35 days.

(21) Appl. No.: 18/741,801

(22) Filed: Jun. 13, 2024

(65) Prior Publication Data

US 2025/0321270 A1    Oct. 16, 2025

(30) Foreign Application Priority Data

Apr. 10, 2024   (TW) ................................. 113113199

(51) Int. Cl.
*G01R 31/3181* (2006.01)
*G11C 29/50* (2006.01)

(52) U.S. Cl.
CPC .. *G01R 31/31813* (2013.01); *G11C 29/50004* (2013.01)

(58) Field of Classification Search
CPC ............ G01R 31/319; G01R 31/31921; G01R 31/31924; G01R 31/31813; G01R 31/3187; G11C 29/50004
See application file for complete search history.

(56) References Cited

U.S. PATENT DOCUMENTS

| | | | |
|---|---|---|---|
| 8,405,412 B2 | 3/2013 | Kohler et al. | |
| 9,317,596 B2 | 4/2016 | Donndelinger et al. | |
| 2003/0191998 A1* | 10/2003 | Nakamura | G01R 31/3187 714/733 |
| 2009/0113230 A1* | 4/2009 | Ito | G01R 31/318552 257/E21.616 |
| 2009/0219775 A1 | 9/2009 | Hur et al. | |
| 2017/0285106 A1* | 10/2017 | Maeda | G01R 31/318335 |
| 2022/0076778 A1 | 3/2022 | Kim et al. | |
| 2022/0199182 A1 | 6/2022 | Yang et al. | |

FOREIGN PATENT DOCUMENTS

| | | | |
|---|---|---|---|
| TW | 355797 | 4/1999 | |
| TW | 201306044 | 2/2013 | |
| WO | WO-2008125998 A1 * | 10/2008 | ....... G01R 31/31813 |

OTHER PUBLICATIONS

"Office Action of Taiwan Counterpart Application", issued on Feb. 17, 2025, p. 1-p. 7.

* cited by examiner

Primary Examiner — Shelly A Chase
(74) Attorney, Agent, or Firm — JCIPRNET

(57) ABSTRACT

A test device and a testing method for a memory are provided. The test device includes a selection signal generator and a plurality of test pattern generators. The selection signal generator receives a test signal via a signal input end and detects a voltage variation on the test signal to generate a test mode selection signal. The test pattern generators are coupled between the selection signal generator and a row decoder of the memory device. The test pattern generators receive the test mode selection signal, and one of the test pattern generators is activated according to the test mode selection signal to perform a test operation on at least one of a plurality of memory cell rows in the memory device.

19 Claims, 5 Drawing Sheets

TEST DEVICE AND TESTING METHOD FOR MEMORY DEVICE

CROSS-REFERENCE TO RELATED APPLICATION

This application claims the priority benefit of Taiwan application serial no. 113113199, filed on Apr. 10, 2024. The entirety of the above-mentioned patent application is hereby incorporated by reference herein and made a part of this specification.

BACKGROUND OF THE INVENTION

Field of the Invention

The invention relates to a test device and a testing method for a memory device, and in particular, to a test device and a testing method for failure analysis of a memory device.

Description of Related Art

In prior art, during the failure analysis operation of a memory device, the corresponding voltage may only be applied via a limited power supply voltage receiving pad and a reference ground voltage receiving pad, and current abnormality phenomenon in the memory device is detected with indium gallium arsenide low-light microscopy (InGaAs). However, under such operation, the memory device is operated similarly to a standby state and is in an undetermined state. In such a situation, there is a chance that the circuit block causing the failure in the memory device does not receive the bias voltage, thus causing the current abnormality phenomenon to be unable to be effectively detected, reducing the efficiency of the failure analysis operation.

SUMMARY OF THE INVENTION

The invention provides a test device and a testing method for a memory device that may improve the execution efficiency of a failure analysis (FA) operation.

A test device of the invention includes a selection signal generator and a plurality of test pattern generators. The selection signal generator receives a test signal via a signal input end and detects a voltage variation on the test signal to generate a test mode selection signal. The test pattern generators are coupled between the selection signal generator and a row decoder of the memory device. The test pattern generators receive the test mode selection signal, and one of the test pattern generators is activated according to the test mode selection signal to perform a test operation on at least one of a plurality of memory cell rows in the memory device.

A testing method for a memory device of the invention includes: receiving a test signal via a signal input end and detecting a voltage variation on the test signal to generate a test mode selection signal; providing a plurality of test pattern generators so that the test pattern generators receive the test mode selection signal; and activating one of the test pattern generators according to the test mode selection signal to perform a test operation on at least one of a plurality of memory cell rows in the memory device.

Based on the above, the test device of the invention determines whether to activate the test operation corresponding to the failure analysis and determines the test mode of the test operation to be performed by detecting the voltage variation of the test signal on the signal input end. The test device of the invention is also provided with the plurality of test pattern generators to perform different modes of test operations on the plurality of memory cell rows of the memory device according to the voltage variation state of the test signal.

DESCRIPTION OF THE EMBODIMENTS

Figure 1:
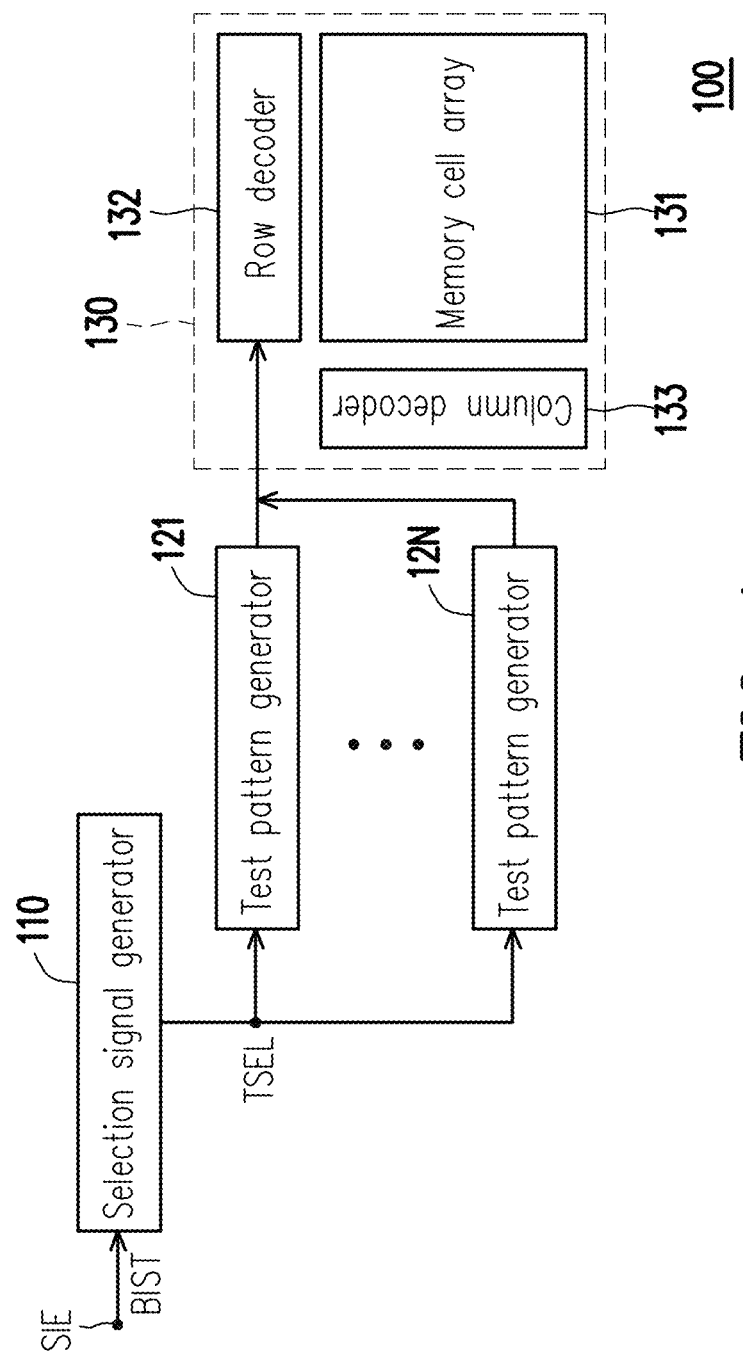
FIG. 1 and FIG. 2 show schematic diagrams of test devices of some embodiments of the invention.

Please refer to FIG. 1 which is a schematic diagram of a test device of an embodiment of the invention. A test device 100 includes a selection signal generator 110 and a plurality of test pattern generators 121 to 12N. The selection signal generator 110 is coupled to a signal input end SIE and receives a test signal BIST via the signal input end SIE. The selection signal generator 110 is used to detect the voltage variation on the test signal BIST to generate a test mode selection signal TSEL. The test pattern generators 121 to 12N are coupled to the selection signal generator 110. The test pattern generators 121 to 12N receive the test mode selection signal TSEL generated by the selection signal generator 110.

The test pattern generators 121 to 12N are coupled to a memory device 130. The memory device 130 includes a memory cell array 131, a row decoder 132, and a column decoder 133. In particular, the test pattern generators 121 to 12N are coupled to the row decoder 132. Moreover, one of the test pattern generators 121 to 12N may be activated according to the test mode selection signal TSEL and perform a test operation on at least one of a plurality of memory cell rows in the memory device 130.

Please note that in the present embodiment, the selection signal generator 110 may determine the logic value of the generated test mode selection signal TSEL according to the state of the voltage variation of the test signal BIST on the signal input end SIE. Moreover, one of the test pattern generators 121 to 12N may be activated according to the logic value of the test mode selection signal TSEL and perform the corresponding test operation on the memory device 130.

It is worth mentioning that the test operations performed by each of the test pattern generators 121 to 12N may be different. In other words, when a specific test operation is to be performed on the memory device 130, by making the test signal BIST generate the corresponding voltage variation, the corresponding test pattern generators 121 to 12N may be activated to perform the desired test operation.

In the present embodiment, when the voltage value on the test signal BIST remains at a fixed value without effective variation, the test operations of the test pattern generators 121 to 12N may all not be activated. In addition, at most one of the test pattern generators 121 to 12N may be activated.

Figure 2:
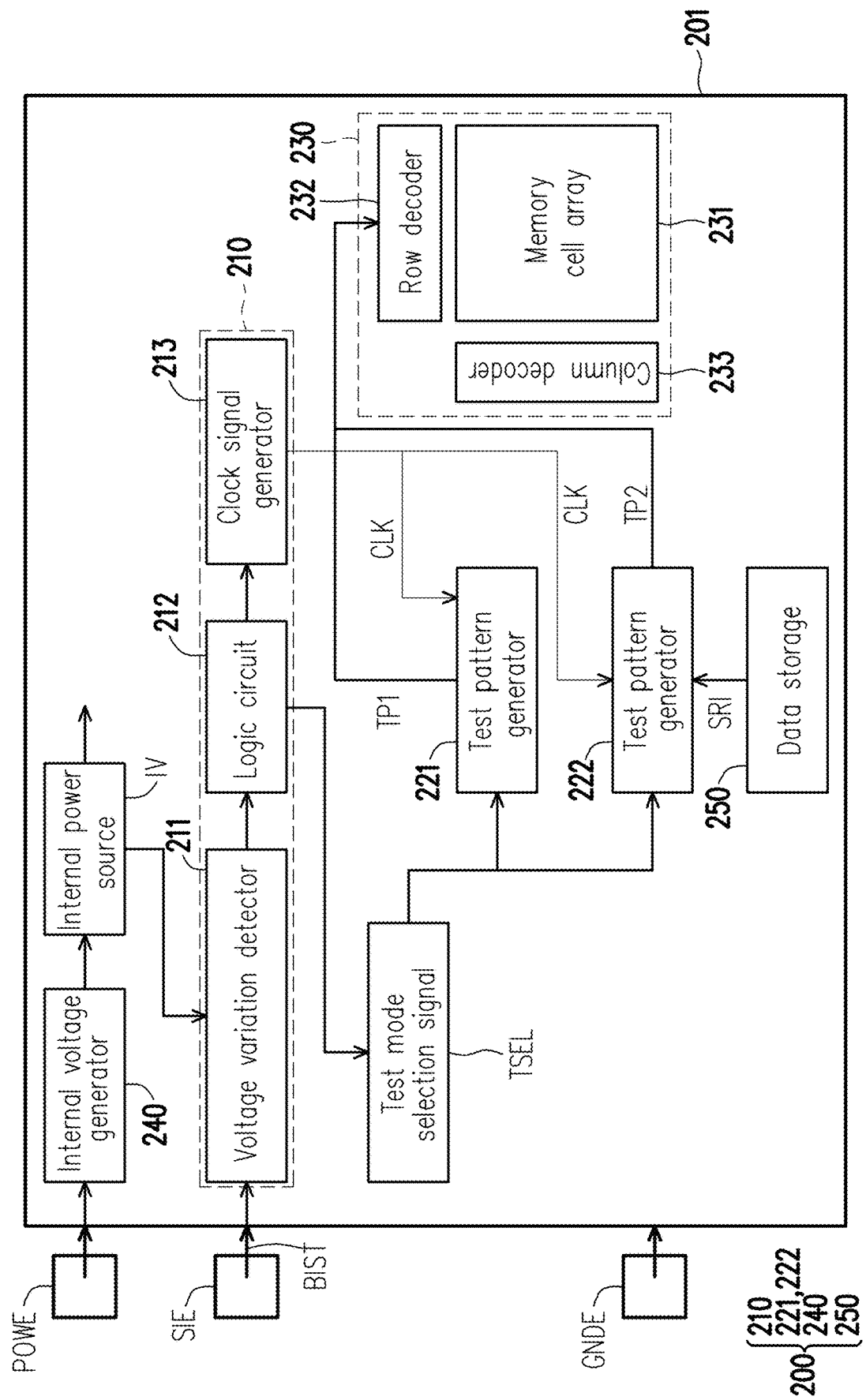

Please refer to FIG. 2 which is a schematic diagram of a test device of another embodiment. In the present embodiment, a test device 200 and a corresponding memory device 230 may be disposed in a same chip 201. The test device 200 includes a selection signal generator 210, test pattern generators 221 and 222, an internal voltage generator 240, and a data storage 250. The memory device 230 has a memory cell array 231, a row decoder 232, and a column decoder 233.

The internal voltage generator 240 is coupled to a power supply voltage receiving end POWE. The power supply voltage receiving end POWE may be coupled to the power supply voltage receiving pad of the chip 201 to receive an external power source. The internal voltage generator 240 is used to convert the received external power source to generate an internal power source IV. The internal voltage generator 240 may provide the generated Internal power source IV to various circuit blocks in the chip 201 such as the selection signal generator 210 and the test pattern generators 221 and 222.

The selection signal generator 210 is coupled to the signal input end SIE. The signal input end SIE may be coupled to the signal input pad on the chip 201. The selection signal generator 210 includes a voltage variation detector 211, a logic circuit 212, and a clock signal generator 213. The voltage variation detector 211 receives the test signal BIST on the signal input end SIE and generates a detection result by detecting the voltage variation on the test signal BIST. The logic circuit 212 is coupled to the output terminal of the voltage variation detector 211 for receiving the output result generated by the voltage variation detector 211 and performing a logic operation according to the output result generated by the voltage variation detector 211 to generate the test mode selection signal TSEL.

In the present embodiment, the voltage variation detector 211 may detect whether a pulse wave is generated on the test signal BIST to generate a detection result. In particular, when the voltage variation detector 211 detects that the test signal BIST has a positive pulse wave, the logic circuit 212 may generate the test mode selection signal TSEL as a first logic value according to the detection result of the voltage variation detector 211. Also, when the voltage variation detector 211 detects that the test signal BIST has a negative pulse wave, the logic circuit 212 may generate the test mode selection signal TSEL as a second logic value according to the detection result of the voltage variation detector 211. Also, if the voltage variation detector 211 detects that the voltage on the test signal BIST remains at a fixed value (for example, equal to the reference ground voltage), the logic circuit 212 may generate the test mode selection signal TSEL as a third logic value according to the detection result of the voltage variation detector 211. In particular, the first logic value, the second logic value, and the third logic value are not equal to each other.

In detail, the voltage variation detector 211 may periodically sample the voltage value on the test signal BIST and compare the obtained result with a first threshold value and a second threshold value. In particular, the first threshold value may be a positive value, and the second threshold value may be a negative value. When the voltage variation detector 211 detects that the voltage on the test signal BIST remains greater than the first threshold value for longer than a preset time length, the voltage variation detector 211 may determine that a positive pulse wave is generated on the test signal BIST. In contrast, when the voltage variation detector 211 detects that the voltage on the test signal BIST remains less than the second threshold value for longer than the preset time length, the voltage variation detector 211 may determine that a negative pulse wave is generated on the test signal BIST. Moreover, if the voltage variation detector 211 detects that the voltage on the test signal BIST remains between the first threshold value and the second threshold value, the voltage variation detector 211 may determine that the test signal BIST remains equal to the reference ground voltage.

The above setting operation of the first threshold value and the second threshold value may avoid unexpected voltage disturbances in the test signal BIST due to noise, which may lead to an error of the test operation. The size of the first threshold value and the second threshold value may be set by the designer according to the use environment and the electrical characteristics of the chip 201, and there are no specific restrictions.

Moreover, the clock signal generator 213 is coupled to the output terminal of the logic circuit 212 and may determine whether the test operation needs to be activated according to the test mode selection signal TSEL. The clock signal generator 213 is activated correspondingly when the test operation needs to be activated, and is used to generate a clock signal CLK. In particular, the clock signal generator 213 may provide the clock signal CLK to the test pattern generators 221 and 222 as the working clock of the test pattern generators 221 and 222.

The test pattern generators 221 and 222 are coupled to the logic circuit 212 to receive the test mode selection signal TSEL. Each of the test pattern generators 221 and 222 may be activated or not according to the logic value of the test mode selection signal TSEL. Following the above implementation examples, when the test mode selection signal TSEL is the first logic value, the test pattern generator 221 may be activated but the test pattern generator 222 may not be activated. When the test mode selection signal TSEL is the second logic value, the test pattern generator 222 may be activated but the test pattern generator 221 may not be activated. In addition, when the test mode selection signal TSEL is the third logic value, neither the test pattern generators 221 and 222 is activated.

When the test pattern generator 221 is activated, the test pattern generator 221 may generate a corresponding test pattern TP1, and make all of the memory cell rows in the memory device 230 perform a test operation via the generated test pattern TP1. In detail, when the test pattern generator 221 is activated, all of the memory cell rows in the memory device 230 may be sequentially turned on and off for one or a plurality of cycles. During the operation of failure analysis, when it is found that a phenomenon of abnormal current occurs in the memory cell array 231 of the memory device 230, the test pattern generator 221 may be activated so that all of the memory cell rows in the memory device 230 are sequentially turned on and off for one or a plurality of cycles, then, with an indium gallium arsenide low-light microscope (InGaAs), the bright spots where abnormal current occurs in the memory cell array 231 are observed to learn the failure state of the memory cell array 231.

Moreover, when the test pattern generator 222 is activated, the test pattern generator 222 may also generate a corresponding test pattern TP2 and make one or a plurality of selected memory cell rows in the memory device 230 perform a test operation via the generated test pattern TP2. In detail, when the test pattern generator 222 is activated, one or a plurality of selected memory cell rows in the memory device 230 may be sequentially turned on and off for one or a plurality of cycles. During the operation of failure analysis, when it is found that a phenomenon of abnormal current occurs in one or a plurality of specific memory cell arrays 231 of the memory device 230, the above known abnormal memory cell rows may be set as the selected memory cell rows. Then, by activating the test pattern generator 222, the selected memory cell rows in the memory device 230 are sequentially turned on and off for one or a plurality of cycles, then, with a gallium indium arsenide low-light microscope, the bright spots where abnormal current occurs in the memory cell array 231 are observed to determine the failure state of the memory cell array 231.

It is worth mentioning that the data storage 250 may be used to store position information SRI of the selected memory cell rows. The data storage 250 is coupled to test pattern generator 222. When the test pattern generator 222 is activated, the test pattern generator 222 may obtain the position information SRI of the selected memory cell rows by reading the data storage 250. In the present embodiment, the data storage 250 may be formed by an electronic fuse circuit, or, the data storage 250 may also be formed by any form of rewritable non-volatile memory (such as flash memory) without certain limitations.

Incidentally, in the present embodiment, the chip 201 has a reference ground voltage receiving terminal GNDE coupled to the ground pad of the chip 201 and used to receive the reference ground voltage. Moreover, based on the test device 200 being disposed in the chip 201, the test device 200 may be a built-in self-test (BIST) circuit of the chip 201, and the test signal BIST may be a built-in self-test signal.

Figure 3:
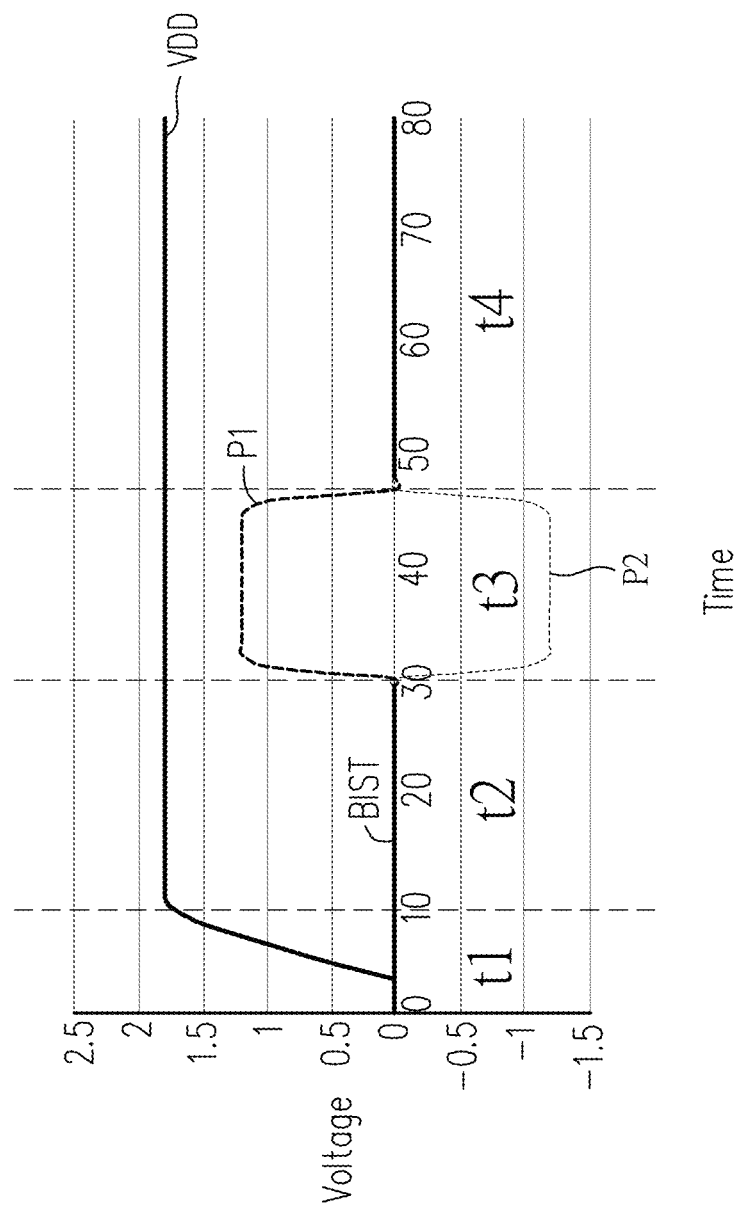
FIG. 3 shows a schematic diagram of the working sequence of a test device of an embodiment of the invention.

Regarding the working sequence of the test device 200, reference may be made to FIG. 3 which is a schematic diagram of the working sequence of a test device of an embodiment of the invention. In particular, during a time interval t1, a power supply voltage VDD rises in a ramp manner and gradually rises to a stable voltage value (for example, 2 V). Then, during a time interval t2, the power supply voltage VDD rises to a stable voltage value and is in a power ready state. At this time, the chip may perform a power on reset (POR) operation.

During a time interval t3, the test device detects the voltage variation of the test signal BIST. If the test signal BIST is triggered and has a positive pulse P1, the corresponding test pattern generator is activated, and during a time interval t4, all of the memory cell rows in the memory device are sequentially turned on and off, and one or a plurality of cycles are executed. In contrast, during the time interval t3, if the test signal BIST is triggered and has a negative pulse P2, the corresponding test pattern generator is activated, and during the time interval t4, one or a plurality of the selected memory cell rows in the memory device are turned on and off, and one or a plurality of cycles are executed. In addition, if the test signal BIST is not triggered during the time interval t3 and remains at the reference ground voltage, all of the test pattern generators are not activated during the time interval t4.

Figure 4:
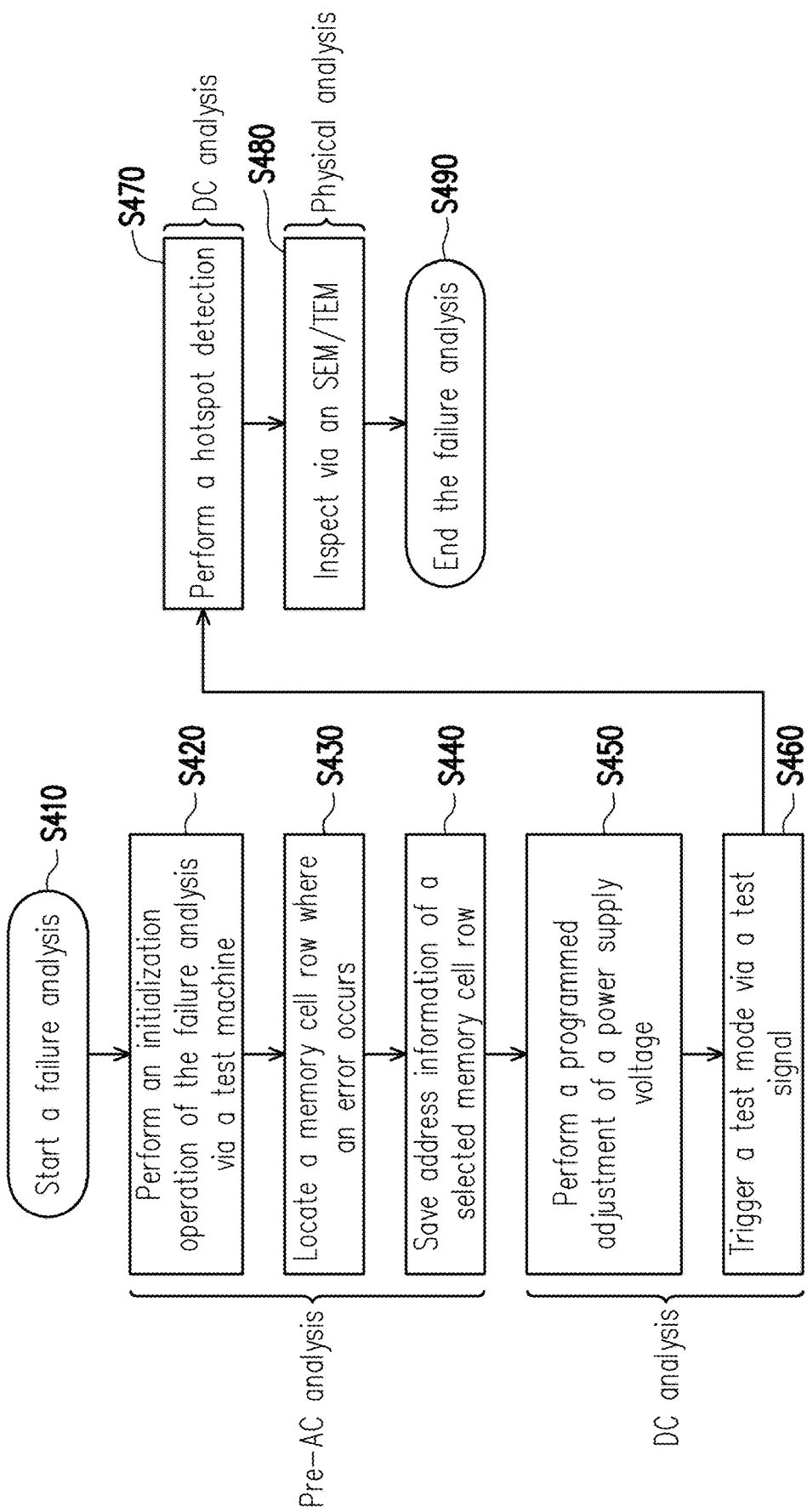
FIG. 4 shows a flowchart of a failure analysis operation of an embodiment of the invention.

Please refer to FIG. 4, which shows a flowchart of a failure analysis operation of an embodiment of the invention. Failure analysis begins in step S410. Next, in step S420, a test machine may perform an initialization operation of failure analysis on a chip. This initialization operation may be set by the test machine for all pads (contacts) on the chip. In step S430, the test machine may locate the memory cell row in which an error occurred, and, in step S440, a test machine may set a selected memory cell row corresponding to the memory cell row where the error occurs, and store address information of the selected memory cell row. Here, the test machine may write the address information of the selected memory cell row into a chip under test. Take FIG. 2 as an example. For example, the test machine may write the address information of the selected memory cell row into the data storage 250 of the chip 201.

Here, taking the data storage 250 formed by an electronic fuse circuit as an example, the test machine may complete a writing operation of the address information of the selected memory cell row by blowing a portion of the fuses in the data storage 250.

Steps S420 to S440 are pre-alternating current (AC) signal analysis of the failure analysis of the present embodiment.

Next, in step S450, the test machine may perform a programmed adjustment on a power supply voltage of the chip under test, and in step S460, trigger a test mode activated by a test device in the chip by sending a test signal to the chip. During the process of activating the test mode in step S460, via step S470, an operation of hot spot detection may be performed on the memory device to analyze an area in the memory cell array generating an abnormal current.

Steps S450 to S470 are direct current (DC) signal analysis of failure analysis of the present embodiment.

Next, in step S480, a physical property analysis operation of a scanning electron microscope (SEM) and a transmission electron microscope (TEM) may be performed on the area in the chip where the current abnormality occurs, and the failure analysis operation is ended in step S490.

Figure 5:
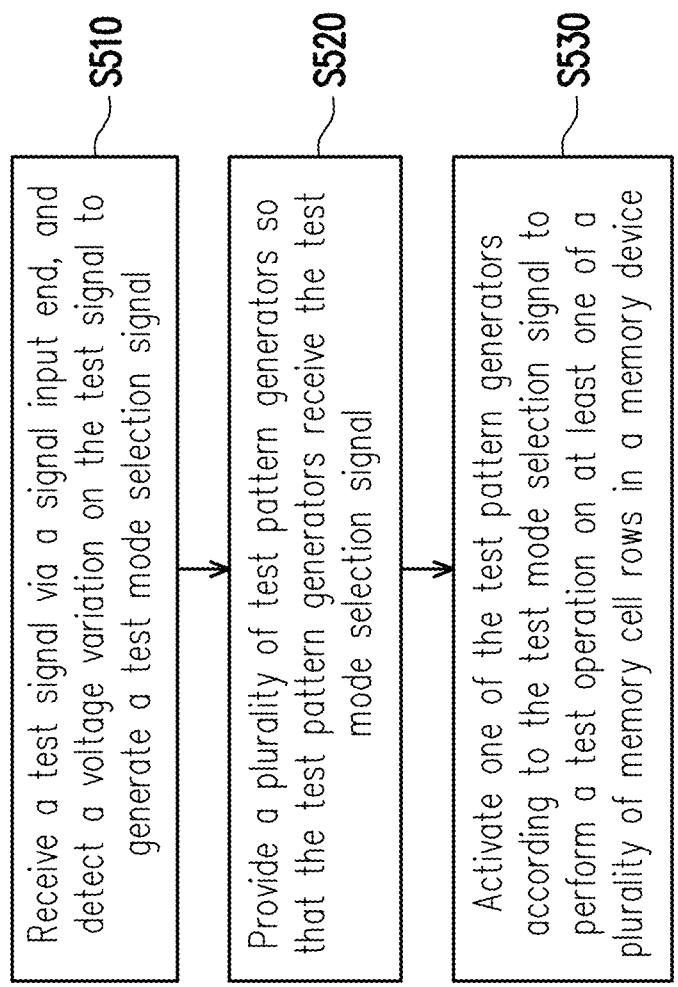
FIG. 5 shows a flowchart of a testing method of a memory device of an embodiment of the invention.

Please refer to FIG. 5 which is a flowchart of a testing method of a memory device of an embodiment of the invention. In particular, in step S510, a test device may receive a test signal via a signal input end and detect a voltage variation on the test signal to generate a test mode selection signal. In step S520, the test device may provide a plurality of test pattern generators and make the test pattern generators receive the test mode selection signal. In step S530, the test device may activate one of the test pattern generators according to the test mode selection signal to perform a test operation on at least one of the plurality of memory cell rows in the memory device. The implementation details of the above steps S510 to S530 are described in detail in the above embodiments and are not described again here.

Based on the above, the test device of the invention activates different modes of test operations by detecting the voltage variation of the test signal on the signal input end. Accordingly, via the plurality of modes of test operations, the plurality of cycles of test operations may be performed on the failed memory line to find the location where the failure occurs, thus effectively improving the performance of the failure analysis operation.

What is claimed is:

1. A test device, comprising:
a selection signal generator receiving a test signal via a signal input end and detecting a voltage variation on the test signal to generate a test mode selection signal; and
a plurality of test pattern generators coupled between the selection signal generator and a row decoder of a memory device,
wherein the test pattern generators receive the test mode selection signal, and one of the test pattern generators is activated according to the test mode selection signal to perform a test operation on at least one of a plurality of memory cell rows in the memory device.

2. The test device of claim 1, wherein when the selection signal generator detects that the test signal is generated with a positive pulse, the test mode selection signal as a first logic value is generated, and when the selection signal generator detects that the test signal is generated with a negative pulse, the test mode selection signal as a second logic value is generated, and the first logic value is different from the second logic value.

3. The test device of claim 2, wherein when the test mode selection signal is the first logic value, a first test pattern generator in the test pattern generators is activated and a first test pattern is generated to make all of the memory cell rows perform the test operation.

4. The test device of claim 3, wherein the first test pattern generator causes each of the memory cell rows to be sequentially turned on and off for at least one cycle according to the first test pattern.

5. The test device of claim 3, wherein when the test mode selection signal is the second logic value, a second test pattern generator in the test pattern generators is activated and a second test pattern is generated to make at least one selected memory cell row in the memory cell rows perform the test operation.

6. The test device of claim 5, wherein the second test pattern generator causes the at least one selected memory cell row to be turned on and off for at least one cycle according to the second test pattern.

7. The test device of claim 1, wherein the selection signal generator stops activating the test operation when detecting that the test signal remains at a reference ground voltage.

8. The test device of claim 1, wherein the selection signal generator comprises:
a voltage variation detector generating a detection result according to a voltage variation on the test signal; and
a logic circuit performing a logic operation for the detection result to generate the test mode selection signal.

9. The test device of claim 8, wherein the selection signal generator further comprises:
a clock signal generator, wherein when the test operation is activated, a clock signal is provided to the test pattern generators as a working clock signal of the test pattern generators.

10. The test device of claim 1, further comprising:
an internal voltage generator coupled to a power supply voltage receiving end and receiving an external power supply and generating an Internal power source according to the external power supply,
wherein the Internal power source is used as an operating power supply for the selection signal generator and the test pattern generators.

11. The test device of claim 1, further comprising:
a data storage coupled to one of the test pattern generators for storing address information of at least one selected memory cell row.

12. A testing method for a memory device, comprising:
receiving a test signal via a signal input end and detecting a voltage variation on the test signal to generate a test mode selection signal;
providing a plurality of test pattern generators so that the test pattern generators receive the test mode selection signal; and
activating one of the test pattern generators according to the test mode selection signal to perform a test operation on at least one of a plurality of memory cell rows in the memory device.

13. The testing method of claim 12, further comprising:
generating the test mode selection signal as a first logic value when the test signal is detected to have a positive pulse wave; and
generating the test mode selection signal as a second logic value when the test signal is detected to have a negative pulse wave, wherein the first logic value and the second logic value are different.

14. The testing method of claim 13, further comprising:
activating a first test pattern generator in the test pattern generators and generating a first test pattern to make all of the memory cell rows perform the test operation when the test mode selection signal is the first logic value.

15. The testing method of claim 14, wherein the step of generating the first test pattern to make all of the memory cell rows perform the test operation comprises:
making the first test pattern generator turn each of the memory cell rows on and off sequentially for at least one cycle according to the first test pattern.

16. The testing method of claim 13, further comprising:
activating a second test pattern generator in the test pattern generators and generating a second test pattern to make at least one selected memory cell row in the memory cell rows perform the test operation when the test mode selection signal is the second logic value.

17. The testing method of claim 16, wherein the step of generating the second test pattern to make the at least one selected memory cell row in the memory cell rows perform the test operation comprises:
making the second test pattern generator turn the at least one selected memory cell row on and off for at least one cycle according to the second test pattern.

18. The testing method of claim 12, further comprising:
making the selection signal generator stop activating the test operation when the test signal is detected to remain at a reference ground voltage.

19. The testing method of claim 12, further comprising:
providing a data storage to store address information of at least one selected memory cell row.

* * * * *